(12) United States Patent
Tian (10) Patent No.: US 6,542,189 B1
(45) Date of Patent: Apr. 1, 2003

(54) FREQUENCY COMPENSATED MULTIPLE SAMPLING METHOD FOR A VIDEO DIGITAL CAMERA

(75) Inventor: Hui Tian, Stanford, CA (US)

(73) Assignee: Pixim, Inc., Mountain View, CA (US)

( * ) Notice: Subject to any disclaimer, the term of this patent is extended or adjusted under 35 U.S.C. 154(b) by 0 days.

(21) Appl. No.: 10/005,834

(22) Filed: Nov. 8, 2001

(51) Int. Cl.$^7$ .......................... H04N 3/14; H04N 5/238; H04N 1/04
(52) U.S. Cl. ........................................ 348/297; 348/364
(58) Field of Search ................................. 348/362, 364, 348/296, 297

(56) References Cited

U.S. PATENT DOCUMENTS 5,264,944 A * 11/1993 Takemura .................. 358/335
5,534,924 A * 7/1996 Florant ...................... 348/364

FOREIGN PATENT DOCUMENTS

JP          04-313949    *  5/1992   ............ H04N/1/04

* cited by examiner

*Primary Examiner*—Wendy R. Garber
*Assistant Examiner*—Catherine Toppin
(74) *Attorney, Agent, or Firm*—Joe Zheng; Carmen C. Cook (57) ABSTRACT

A system and method for performing frequency compensation in a video digital camera utilizing a time-indexed multiple sampling technique is presented. The frequency compensation removes distortion from the digital image signal captured by the video digital camera as compared with a human-perceived image signal.

11 Claims, 8 Drawing Sheets

FREQUENCY COMPENSATED MULTIPLE SAMPLING METHOD FOR A VIDEO DIGITAL CAMERA

BACKGROUND

1. Field of the Invention

This invention relates to digital photography, and more particularly to a frequency compensation technique for a digital video camera.

2. Description of Related Art

Digital photography is one of the most exciting technologies to have emerged during the twentieth century. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make the digital cameras one of the hottest new category of consumer electronics products.

Digital cameras, however, do not work in the same way as traditional film cameras do. In fact, they are more closely related to computer scanners, copiers, or fax machines. Most digital cameras use an image sensor or photosensitive device, such as a charged-coupled device (CCD) or a complementary metal-oxide semiconductor (CMOS) sensor to sense an image. An array of these image sensors are arranged in the focal plane of the camera such that each sensor produces an electrical signal proportional to the light intensity at its location.

The image thus produced has a resolution determined by the number of sensors in the array. A modern digital camera may have a million or more of these sensors. The resulting image will be digital, having picture elements (pixels) corresponding to the number of sensors in the array. Because of the correlation, the sensor elements themselves are often referred to as pixels as well.

Sensor arrays are known in many forms. One common one is a two dimensional form addressable by row and column. Once a row of elements has been addressed, the analog signals from each of the sensors in the row are coupled to the respective columns in the array. An analog-to-digital converter (ADC) may then be used to convert the analog signals on the columns to digital signals so as to provide only digital signals at the output of the array, which is typically formed on an integrated circuit.

Figure 1:
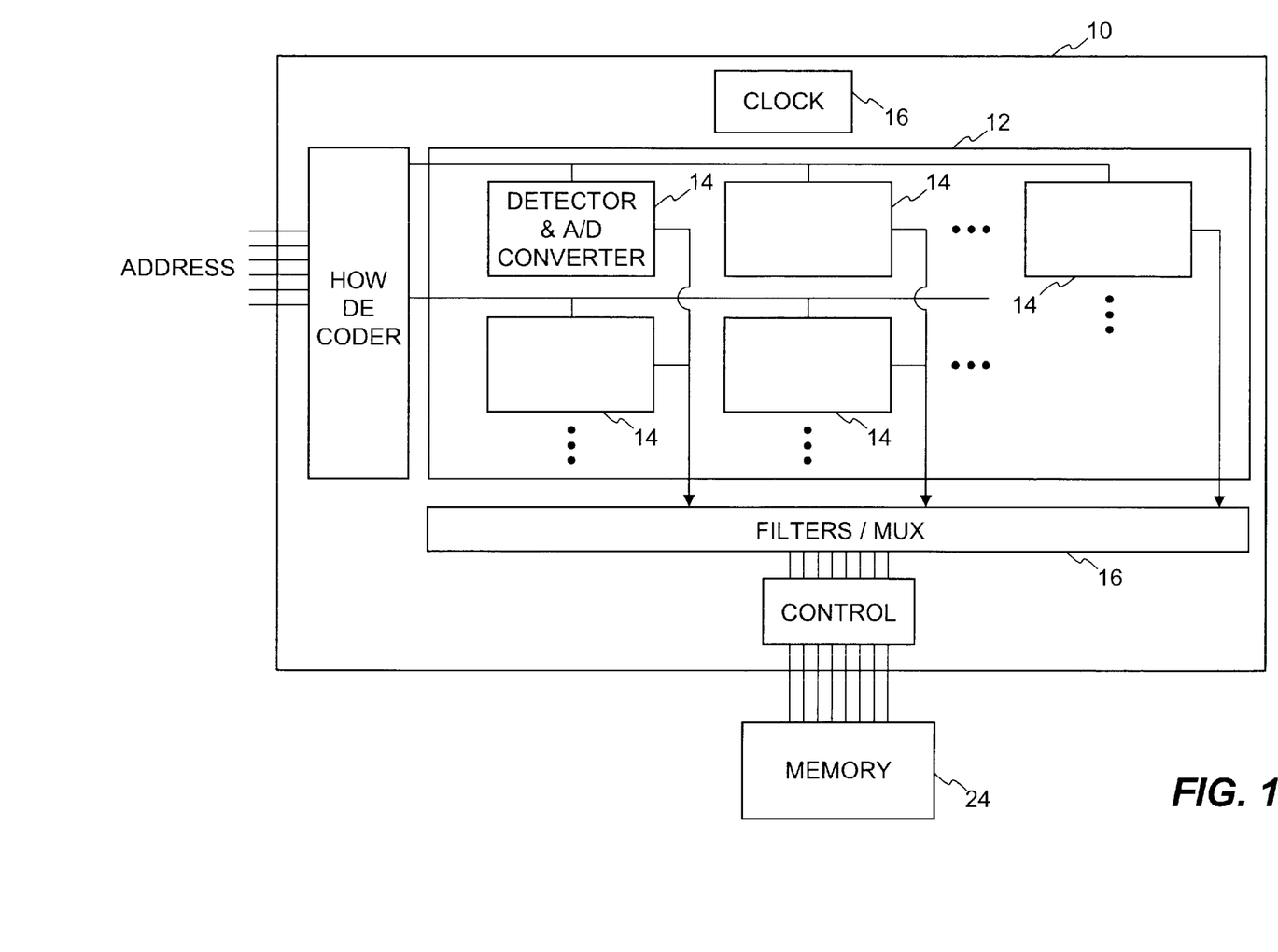
FIG. 1 is a block diagram of a chip containing an array of digital pixel sensors wherein each sensor has a dedicated A/D converter.

Because of a number of problems such as degradation of signal and slow read out times in prior art sensor arrays, a "digital sensor pixel" has been developed as described in, e.g., U.S. Pat. No. 5,461,425, which is hereby incorporated by reference. FIG. 1 illustrates an array 12 of digital sensor pixels 14 on an integrated circuit 10. Each digital sensor pixel 14 in the array 12 includes a photodiode and a dedicated ADC such that the pixel 14 outputs a digital rather than an analog signal as in prior art sensor arrays. In contrast, prior art sensor arrays did not have a dedicated ADC for each individual sensor in the array. Digital filters 16 on integrated circuit 10 are connected to receive the digital output streams from each digital pixel sensor 14 and convert each stream to, e.g., an eight-bit number representative of one of 256 levels of light intensity detected by the respective digital pixel sensor 14. Within the digital pixel sensor 14, the analog signal from the photodiode is converted into a serial bit stream from its dedicated ADC clocked using a common clock driver 18. The digital filters 16 process the bit stream from each digital pixel sensor 14 to generate an eight-bit value per pixel element 14. These eight-bit values may then be output from the chip 10, using a suitable multiplexer or shift register, and temporarily stored in a bit-mapped memory 24.

Because a digital signal is produced directly by the pixel 14, several advantages over the prior art become apparent. For example, dynamic range is a critical figure of merit for image sensors used in digital cameras. The dynamic range of an image sensor is often not wide enough to capture scenes with both highlights and dark shadows. This is especially the case for CMOS sensors that, in general, have lower dynamic range than CCDs.

To address the need for increased dynamic range, U.S. Ser. Nos. 09/567,786 and 09/567,638, both filed May 9, 2000 and incorporated by reference herein, disclose an architecture for the digital pixel sensor in which the dynamic range of the sensor is increased by taking multiple samples of a subject during a single imaging frame, where each sample is taken over an interval of a different duration (integration time) than the other samples. As will be described in greater detail herein, such a multiple sampling architecture avoids limitations in dynamic range as experienced by prior art CMOS sensor arrays. However, despite this advantage, this multiple sampling scheme will introduce certain distortions when implemented in a video camera. These distortions arise between the human-perceived image and that recorded by the video camera. For example, consider the image recorded by a single pixel in a video camera implementing a multiple sampling scheme where the image light intensity varies with time. Because the image light intensity is time-varying, the multiple sampling scheme may alter the effective integration time from frame-to-frame for this pixel. For example, at a first frame the integration time may be "T" seconds long whereas at a second frame the integration time may be 8T seconds in length. In contrast, the human-perceived image may be modeled as having a fixed integration time for these same samples, resulting in distortion between the human-perceived and digitally-recorded images. This distortion will be evident in other digital video systems which do not practice a multiple sampling method but do use different exposure times for a given pixel from frame-to-frame.

Accordingly, there is a need in the art for a video digital camera that benefits from the increased dynamic range afforded by a multiple sampling scheme without suffering distortion with respect to a human-perceived image.

SUMMARY

In accordance with one aspect of the invention, a method of frequency compensation is presented for a video system using an exposure time selected from a set of exposure times for a given pixel. The video system selects the exposure time for the given pixel such that the exposure time varies from video frame to video frame. The resulting image signals from the given pixel will thus be formed with varying exposure times. This method calculates a complete set of image signals for any exposure time selected from the set of exposure times for the given pixel.

In accordance with another aspect of the invention, a frequency-compensated video image system using a time-indexed-multiple-sampling technique is presented. The video image system includes a digital sensor pixel that, in response to an image signal, selects from a plurality of exposure times to form a digital image signal in a given video frame. A memory couples to the digital pixel sensor for storing the digital image signals corresponding to a plurality of video frames, wherein the memory also stores the corresponding exposure time selected for each digital image signal in a given video frame. A processor calculates, from the stored plurality of digital image signals and their corresponding exposure times over the plurality of video frames, a compensated digital image signal for each video frame in the plurality of video frames, wherein the compensated digital image signal uses a constant exposure time from video frame to video frame.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 2:
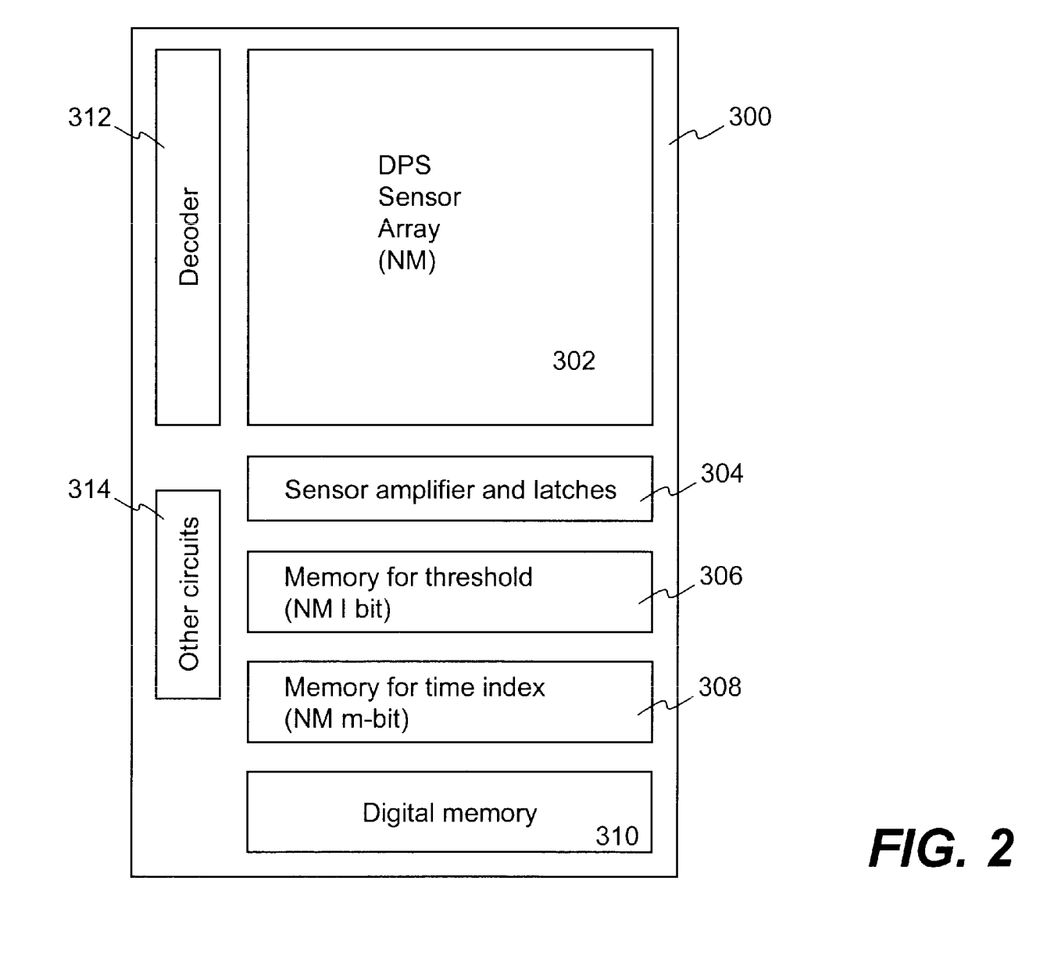
FIG. 2 is a block diagram which shows an image sensor including a threshold memory, a time index memory, and a separate data memory for implementing a time-indexed multiple sampling method to achieve wide dynamic range.

Referring to FIG. 2, there is shown an image sensor 300 for performing a time-indexed-multiple-sampling method according to the methods disclosed in copending U.S. Ser. Nos. 09/567,786 and 09/567,638, both filed May 9, 2000, the contents of both of which are hereby incorporated by reference. The image sensor includes an array 302 of digital pixel sensors such as discussed with respect to U.S. Pat. No. 5,461,425. Sense amplifiers and latches 304 are coupled to the digital pixel sensor array 302 to facilitate read out of the digital signals from the digital pixel sensor array 302. The image sensor 300 also includes a threshold memory 306 for storing threshold values, a time-index memory 308 for storing time-index values, and a digital or data memory 310 that is large enough to accommodate a frame of image data from sensor array 302.

To illustrate the time-indexed-multiple-sampling method it may be assumed that the sensor 302 is of N by M pixels, wherein each pixel produces an image signal of k-bits for a given frame. As used herein, a "frame" shall denote a single video frame formed by the pixel array. As is known in the art, a video is produced by a plurality of video frames wherein the video sampling rate is great enough (typically 30 frames per second) such that a human observer does not detect the video sampling rate. In a given frame, with a time-indexed-multiple-sampling method, however, a given pixel may select between a plurality of exposure times. For example, the pixel may select from four different exposure times: T, 2T, 4T, and 8T, where T is of a suitable length, e.g., 2 milliseconds. Such an image sensor array 302 may thus produce four image samples per frame at four different exposure times (thereby performing a multiple sampling method).

During each exposure time, the digital image signal produced by each digital pixel sensor within the array 302 is tested against a threshold. If the pixel signal exceeds the threshold, a binary flag in threshold memory 306 is set. For an N by M array 302, the size of the threshold memory 306 is of N by M bits. Within each frame, the different time exposures are assigned an integer time index value as determined by the time resolution of the frame division. For example, if the frame is divided into exposure times of T, 2T, 4T, and 8T, the time index would be 1, 2, 3, and 4, respectively (two-bit resolution). An example pixel resolution of sensor 302 is 1024 by 1024 in 10 bits. Thus, the threshold memory 306 is a one-megabit memory, the time index memory 308 is a two-megabit memory, and the digital memory 310 preferably has a size of at least 1.2 megabytes.

Figure 3:
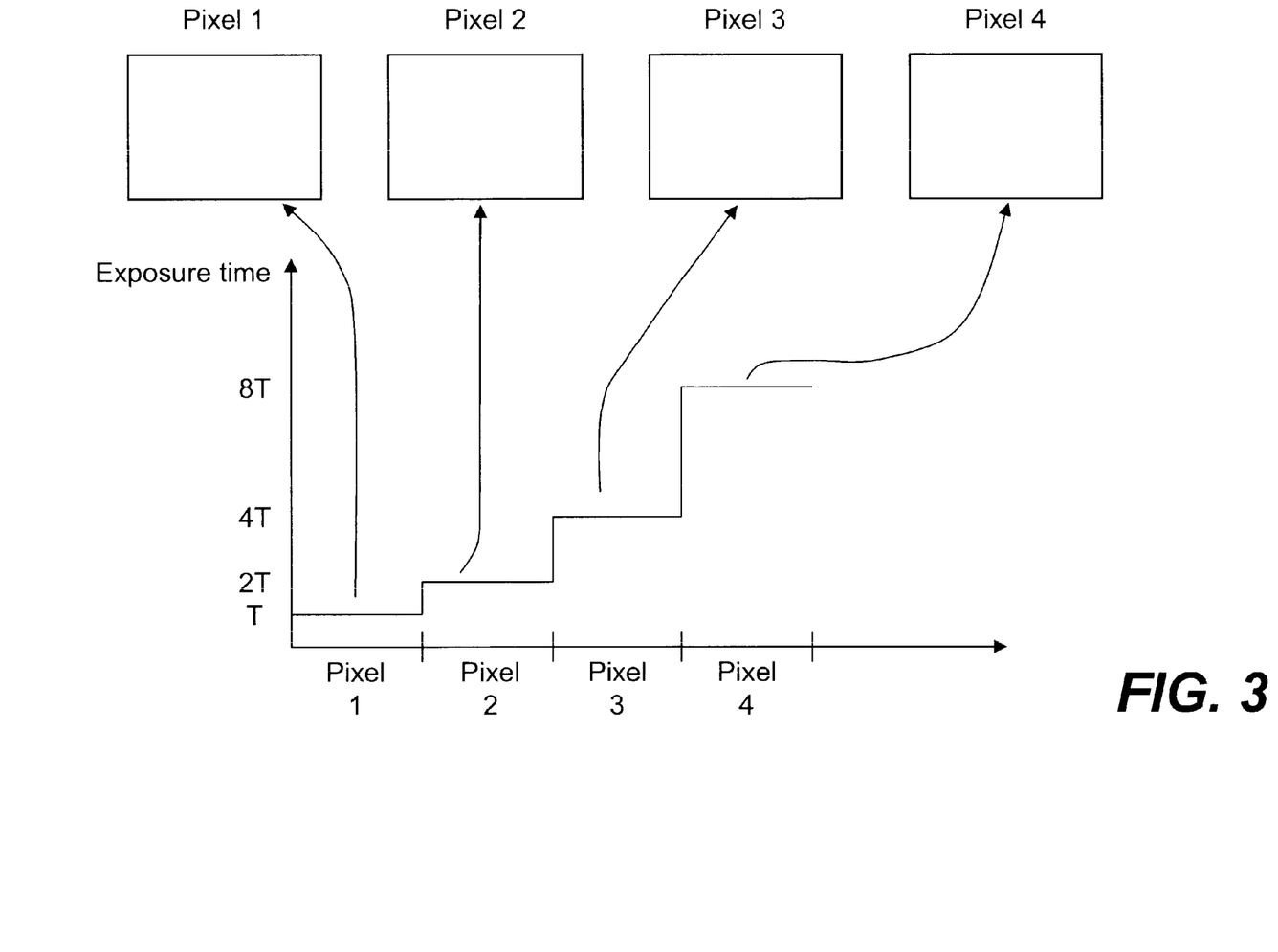
FIG. 3 is a graph which shows an example of multiple exposures.

FIG. 3 illustrates four digital pixel sensors using a time-indexed multiple sampling method wherein each image frame is divided into exposure times of T, 2T, 4T, and 8T. The light intensity is relatively intense for pixel 1, which uses the exposure time T for this image frame. The light intensity is lower at the location of pixel 2, which uses the exposure time 2T for this image frame. Similarly, the light intensity continues to decrease for pixels 3 and 4 such that the exposure times are 4T and 8T, respectively, for these pixels. One of the advantages of having multiple images of the same target is the ability to expand the dynamic range of the image thus captured. Because of the relative short exposure time, the use of a 1T exposure time in pixel 1 typically captures information that is related to high illumination areas in the target. Likewise, because of the relatively long exposure time, the use of an 8T exposure time in pixel 4 typically captures information that is related to low illumination areas in the target. Pixel 2 and pixel 3 thus capture information that is related to gradually decreased illumination areas in the target. The image signals from the four pixels cannot be directly combined because of the varying exposure times used. Instead, the images must be properly weighted as determined by their exposure times. For example, the image signal from pixel 2 would reduced by a factor of 2, the image signal from pixel 2 reduced by a factor of four, and the image signal from pixel 4 reduced by a factor of eight. The combination of the multiple exposure times in a single image frame provides a very wide dynamic range. Further details regarding a time-indexed multiple sampling method may be found in U.S. Ser. Nos. 09/567,786 and 09/567,638.

Figure 4A:
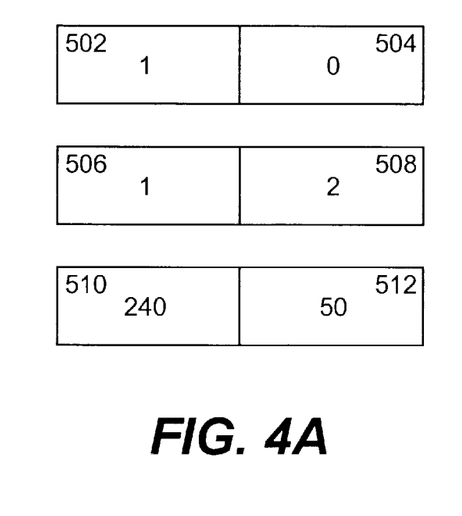
FIG. 4 illustrates an time-varying light signal incident upon a digital pixel sensor and a human eye.
Figure 4B:
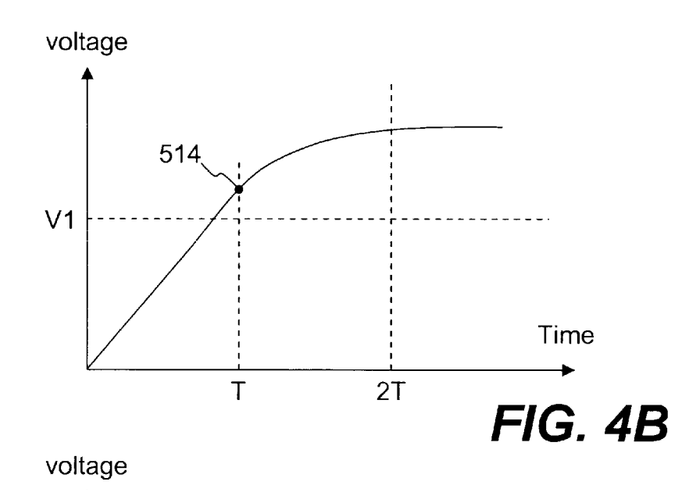
Figure 4C:
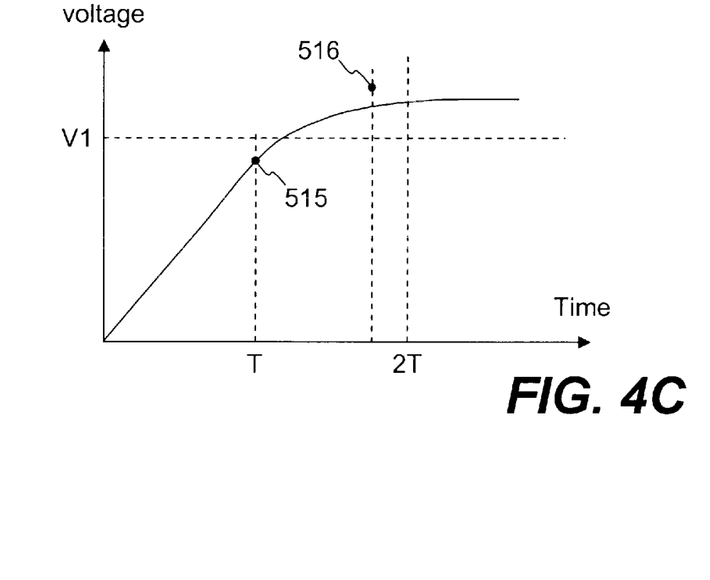

As discussed earlier, a time-indexed multiple sampling method will introduce certain distortions when implemented in a video digital camera. FIG. 4 illustrates a time-varying light signal f(t) incident upon a digital sensor pixel 100 and a human eye 110. The human eye 110 and the digital sensor pixel 100 both produce an image signal in response to f(t). These responses are each a function of F(f), the Fourier transform of f(t). The human-eye-perceived image signal, g(t), may be modeled as a moving average of f(t) over a constant exposure time $T_1$ such that $$g(t) = f(t) * \Pi(t/T_1 + \tfrac{1}{2}) \qquad (1)$$

where the gate function $\Pi(t)$ is given by $$\Pi(x) = \begin{cases} 1 \text{ for } |x| < \frac{1}{2} \\ 0 \text{ for } |x| > \frac{1}{2} \end{cases}$$

In the frequency domain, g(t) becomes $$G(f) = F(f)(\sin(\pi f T_1))/\pi f)\exp(j\pi f T_1) \qquad (2)$$

$$= F(f)C(f) \qquad (3)$$

where C(f) is the sinc function $(\sin(\pi f T_1)/\pi f)\exp(j\pi f T_1)$. To eliminate distortion, an ideal video camera would integrate the received signal as the human eye does, thereby using a constant exposure time for each video frame. However, a digital video camera that implements a time-indexed multiple sampling method will not integrate a given pixel over a constant exposure time, frame-to-frame. Instead, a given pixel will vary its exposure time as required by the changing light intensity at the pixel's location. For example, consider a time-indexed multiple sampling scheme wherein exposure times T, 2T, 4T, and 8T are available for each frame. If a pixel receives a relatively strong light intensity such that the integration time is T, then the pixel image signal g'(t) may be modeled in the frequency domain as $$G'(f) = F(f)C'(f) \qquad (4)$$

Where C'(f) is the appropriate sinc function for an integration time of T. Similarly, if the pixel (or image sensor) uses an integration time 2T, the pixel image signal g"(t) may be modeled in the frequency domain as $$G''(f) = F(f)C''(f) \qquad (5)$$

where C"(f) is the appropriate sinc function for an integration time of 2T. The frequency domain signals G'''(f) and G''''(f) for integration times 4T and 8T, respectively, would be modeled analogously. It may then be seen that the frequency domain image signal for a given pixel employing such a multiple sampling scheme may be modeled as $$G_{multiple-sampling}(f) = F(f)C(f,T) \qquad (6)$$

Where C is a function of both frequency and the integration time T. This is a frequency domain signal unlike that given by equation (3) for the human-perceived image signal and illustrates that a human viewing an uncompensated video produced by a camera having such a time-indexed multiple sampling scheme would experience a certain amount of distortion in the perceived image.

The inventor has discovered a frequency compensation technique that prevents this distortion by converting $G_{multiple-sampling}(f)$ as given by equation (6) to a compensated version $G^c(f)$ that approximates F(f) within the limitations of the Nyquist sampling theorem such that $$F(f) \approx G^c(f) = G_{multiple-sampling}(f)/C(f,T) \qquad (7)$$

$$= \int (g_{multiple-sampling}(t)/C(f,T))\exp-(j\pi ft)dt$$

From equation (4), it may be seen that F(f) is easily reconstructed if G'(f) is known. Similarly, if G"(f), G'''(f), or G''''(f) were known, F(f) may be derived analogously.

However, only partial information on the functions G'(f) through G''''(f) is known in a time-indexed multiple sampling system. For example, consider a multiple sampling method employing two integration times per frame, T and 2T. In this example, only four video frames will be considered for a given pixel, but it will be appreciated that in a real-life example more data samples would likely be required to satisfy Nyquist's theorem. Because the pixel produces a finite-length chain of discrete time samples, the frequency domain signal F(f) is also discrete, having four samples corresponding to the four video frames or time samples. Assume that the light intensity varies such that, for the given pixel, the integration time for the first and third video frame is 2T, whereas for the second and fourth video frames it is T. Thus, the time signal g'(t) (corresponding to an integration over time T) has unknown values in the first and third frames. Similarly, the time signal g"(t) (corresponding to an integration over time 2T) has unknown values for the second and fourth video frames.

These unknown values prevent an immediate calculation of the corresponding frequency domain signals, G'(f) and G"(f), for the respective time-domain signals g'(t) and g"(t). For example, G'(f) may be approximated by its discrete Fourier transform:

$$G'(k) = \Sigma g'(n)\exp(-j(2\pi/4)kn) \qquad (8)$$

where the summation is performed over the four time samples. However, this summation cannot be directly calculated because the time samples of g'(t=1) and g'(t=3) are unknown. Because G'(k) is a discrete Fourier series, it will be periodic such that G'(k)=G'(k+4) as only four time samples are used. Thus, only four samples of G'(k) need be considered from equation (8) as follows:

$$G'(n=1) = F_1[g'(1), g'(2), g'(3), g'(4)]$$

$$G'(n=2) = F_2[g'(1), g'(2), g'(3), g'(4)]$$

$$G'(n=3) = F_3[g'(1), g'(2), g'(3), g'(4)] \qquad \text{Eqs}(9)$$

$$G'(n=4) = F_4[g'(1), g'(2), g'(3), g'(4)]$$

where $F_n$ denotes the discrete fourier transform at the discrete frequency n.

Analogous to equation (8), the discrete Fourier transform for G"(f) is given by:

$$G''(k) = \Sigma g''(n)\exp(-j(2\pi/4)kn) \qquad (10)$$

where the summation is performed over the index n for the four time samples.

Just as with equations (9), only four samples of the discrete Fourier transform for G"(f) need be considered as follows:

$$G''(n=1) = F_1[g''(1), g''(2), g''(3), g''(4)]$$

$$G''(n=2) = F_2[g''(1), g''(2), g''(3), g''(4)]$$

$$G''(n=3) = F_3[g''(1), g''(2), g''(3), g''(4)] \qquad \text{Eqs}(11)$$

$$G''(n=4) = F_4[g''(1), g''(2), g''(3), g''(4)]$$

From equations (4) and (5), either G'(k) or G"(k) may be used to derive F(f), giving:

$$F(f) = G'(k)/C'(k) = G''(k)/C''(k) \qquad (12)$$

Equations (9), (11), and (12) now lead to the following:

$$\Sigma g'(n)\exp(-j(2\pi/4)kn)/C'(k) = \Sigma g''(n)\exp(-j(2\pi/4)kn)/C''(k) \qquad (13)$$

Note that each summation gives four equations (both G'(k) and G"(k) are periodic with a period equal to the number of time samples, which in this example is four). Because there are two unknown time samples for each time function g'(n) and g"(n), equation (11) gives four equations and four unknowns, leading to a determinate solution for the four unknown time samples.

Figure 5:
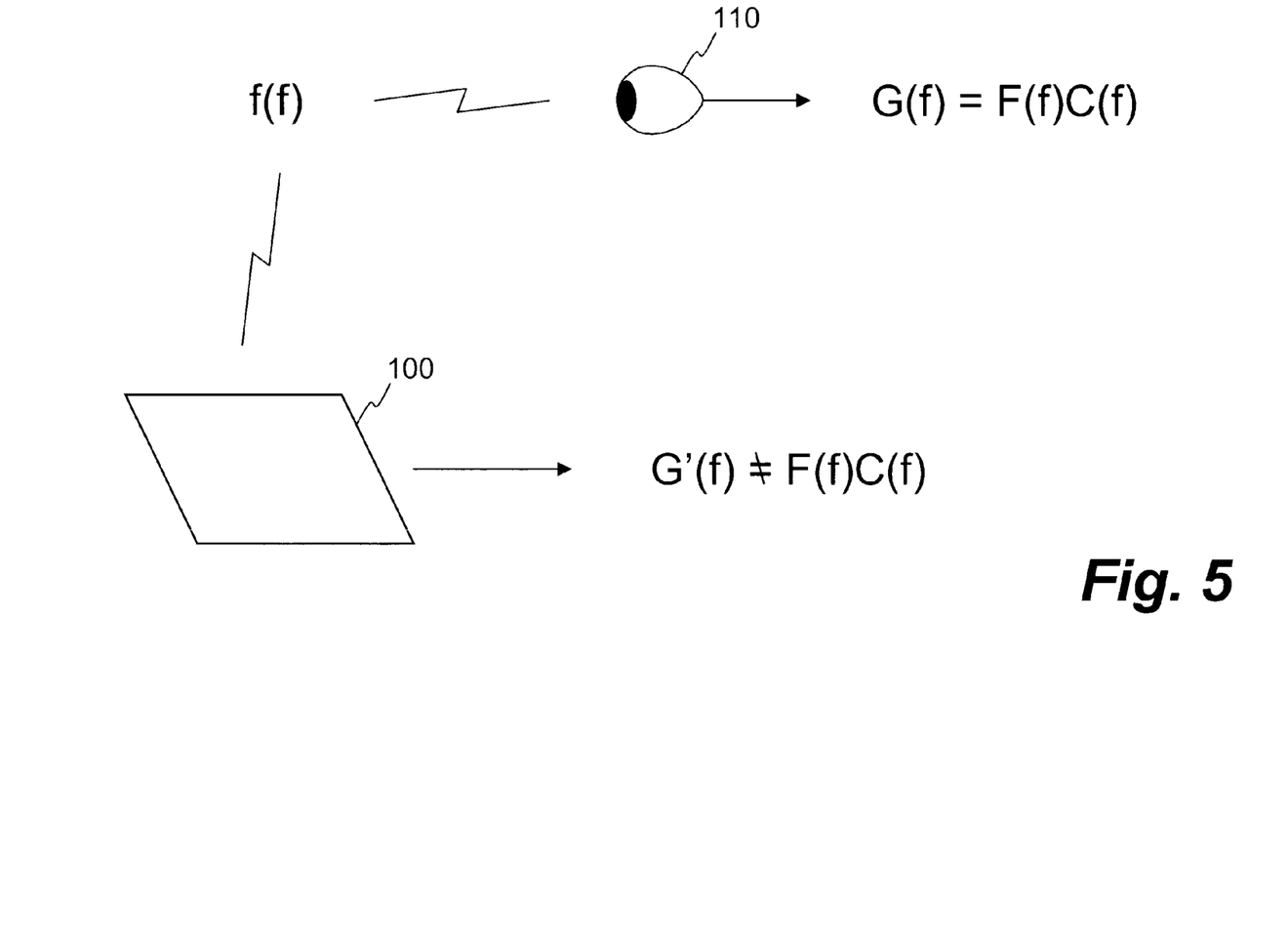
FIG. 5 is a flowchart of a method of frequency compensation according to one embodiment of the invention.

It will be appreciated that this example uses only four video frames and a multiple sampling technique choosing between two exposure times as an illustration—equation (13) may be generalized to include any number of frames and other time sampling schemes. The method may be generalized as illustrated in FIG. 5. At step 610, the method begins by collecting N frames of digital image signals. These N frames of data are from a single digital pixel sensor (or image sensor). It will be appreciated that the method described with respect to FIG. 5 would be repeated for all remaining pixels in a sensor array. The integer N is chosen to satisfy the Nyquist sampling rate. Each frame of data will be the digital image signal from the single digital pixel sensor at a selected exposure time. Thus, at step 620, the digital image signals from the various frames of data are divided into subsets according to their exposure times. For example, a first subset could correspond to those digital image signals having an exposure time T. A second subset could correspond to those digital image signals having an exposure time 2T, and so on. At step 630, the discrete Fourier transform for each subset is formed, where the discrete Fourier transform is given by equation (8). Because of the multiple-time-sampling method being used to form the digital image signals, the subsets will be incomplete as discussed previously. At step 640, each discrete Fourier transformed subset is normalized by the appropriate sinc function, where the sinc function is given by $\sin((\pi k T_1)/N)/(\pi k/N)\exp((j\pi k T_1)/N)$ with $T_1$ the appropriate exposure time, N the number of frames, and k being the discrete frequency index as given by equation (8). Finally, at step 650, the normalized discrete Fourier transformed subsets are equated to one another to allow the determination of the unknown time samples.

Although described with respect to a time-indexed-multiple-sampling video system, the method of the invention may be applied in any video scheme wherein the exposure time varies from frame-to-frame. Note that with the exception of the time samples, the remaining terms of equation (13) will be constant coefficients such as C'(K) and $\exp(-j(2\pi/4))kn$. These coefficients may be predetermined and stored in a ROM for efficient, real-time frequency compensation in a video camera employing a time-indexed multiple sampling technique. Moreover, equation (13) need not be used to solve for all the unknown time samples in each function g'(t) and g"(t). Once a complete set is known for one of the time functions, it may be used to replace the original time samples in the memory array. Because these new time samples effectively have a single exposure time, a human viewer of a video produced by these new time samples will not perceive the distortion that would be presented by an uncompensated time-indexed multiple-sampling video.

Another advantage of the invention becomes apparent with further study of equation (13). As discussed earlier, prior art time-indexed multiple-sampling digital cameras must normalize the digital image signals according to their exposure times. For example, the digital image signal produced by a digital pixel sensor having an exposure time of 8T cannot be directly combined with the digital image signal produced by a digital pixel sensor having an exposure time of T. Instead, the digital image signal having the exposure time of 8T must be divided by 8 to properly combined (combined in the sense of placing both pixel signals into the same image) with the digital image signal having exposure time T. However, in a video digital camera employing the frequency compensation technique of the present invention, no such normalization is necessary. It is unnecessary because the varying integration times are already accounted for in the coefficients corresponding to the sinc functions C'(f) and C"(f).

Figure 6:
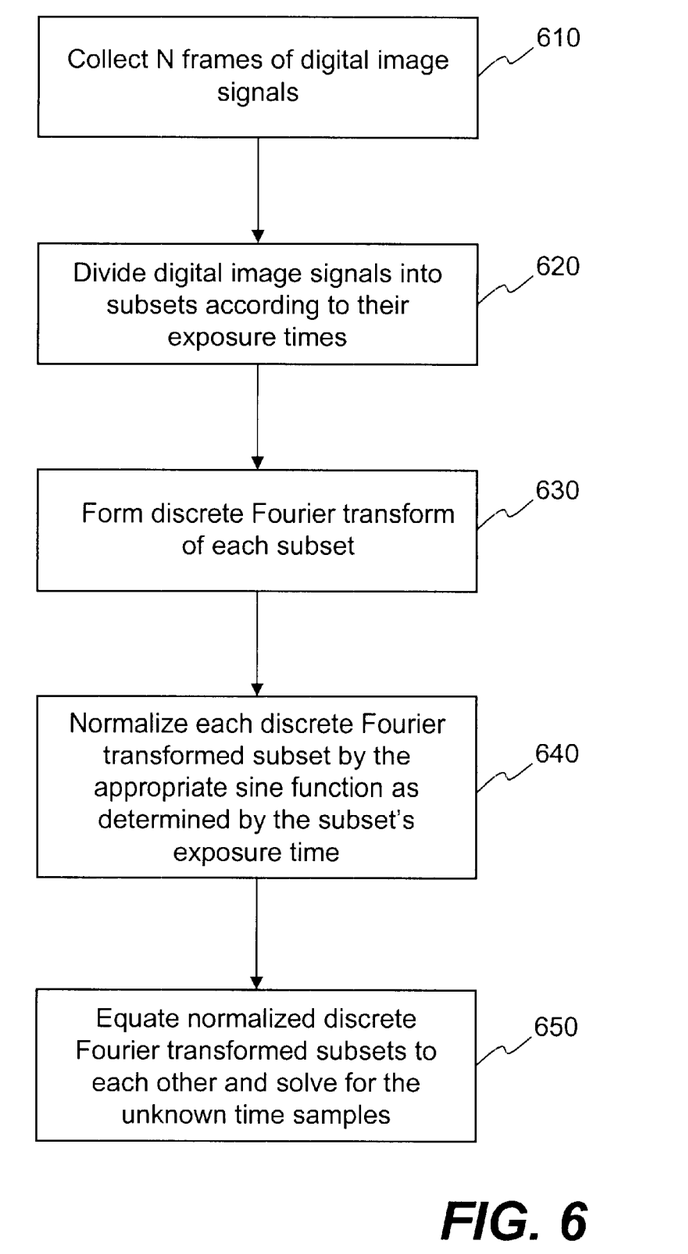
FIG. 6 is a block diagram of a system for performing frequency compensation according to one embodiment of the invention.

Turning now to FIG. 6, a system 140 for implementing a frequency compensation method as discussed with respect to equation (13) is illustrated. The coefficients in equation (13) are predetermined by the number of frames over which compensation will be performed as well as the number of possible pixel integration times per frame. These coefficients may be stored in a buffer 150 for efficient calculation. Because the repeated solution of equation (13) over time involves one operation on multiple sets of data, a single instruction multiple data (SIMD) processor 160 may be used to fetch the required instructions from a memory 170 and the required coefficients from the coefficient buffer 150. Alternatively the instructions and coefficients may be stored in a single memory, although this may be less efficient if the memory doesn't allow simultaneous reading of the instructions and the coefficients.

As discussed with respect to FIG. 2, for each pixel, the digital memory 310 stores the signal value for the current frame. In addition, a time index indicating what integration time is used (e.g., T or 2T) for each pixel is stored in the time-index memory 308. To solve equation (13), the SIMD processor 160 couples to an image sequence buffer 180 that stores both the values in the digital memory 310 and time index memory 308 for all the frames over which compensation is to be performed. The SIMD processor 160 may then perform the required instructions using the time sample data in the image sequence buffer 180 and the coefficients in the buffer 150.

Figure 7:
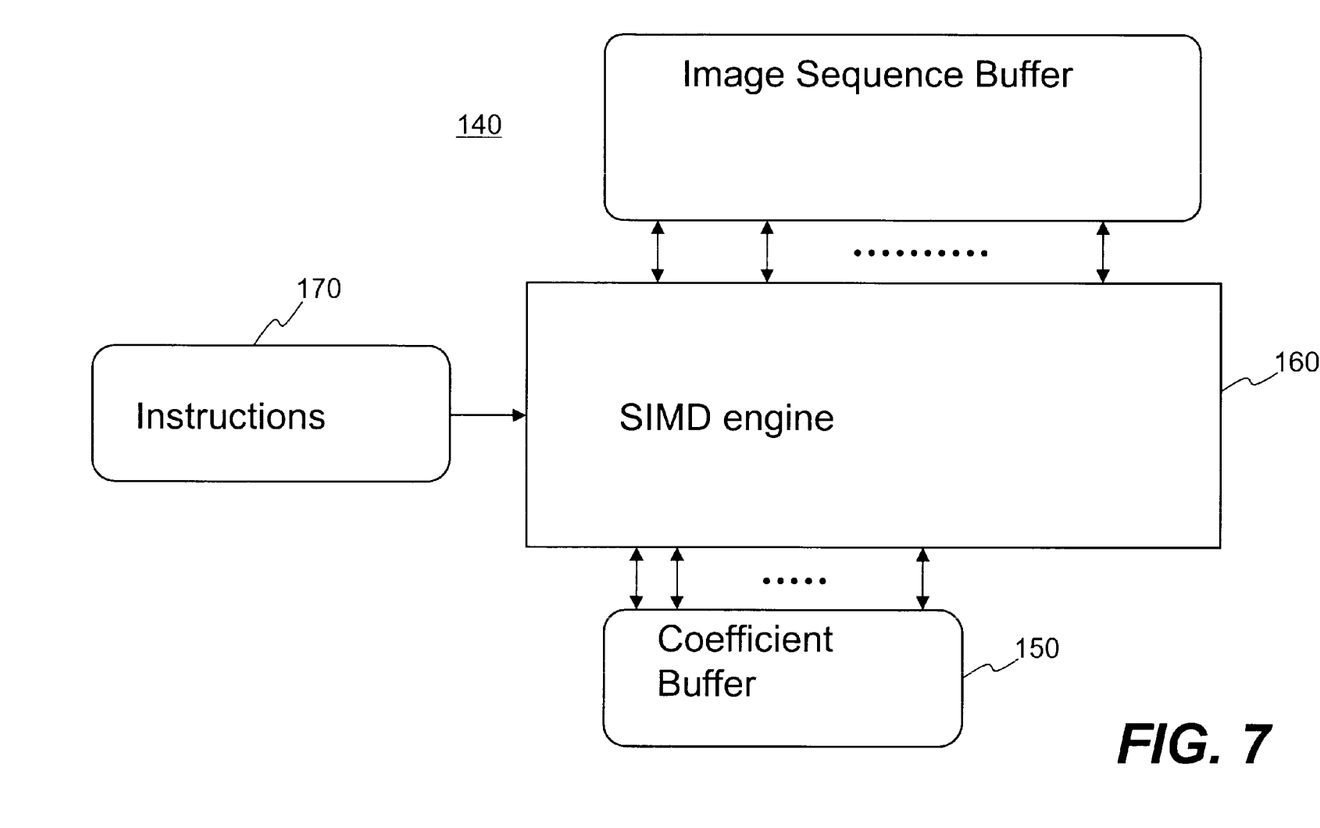
FIG. 7 is a graph of a time-domain simulated image signal and its human-perceived, compensated, and uncompensated digital representations.
Figure 8:
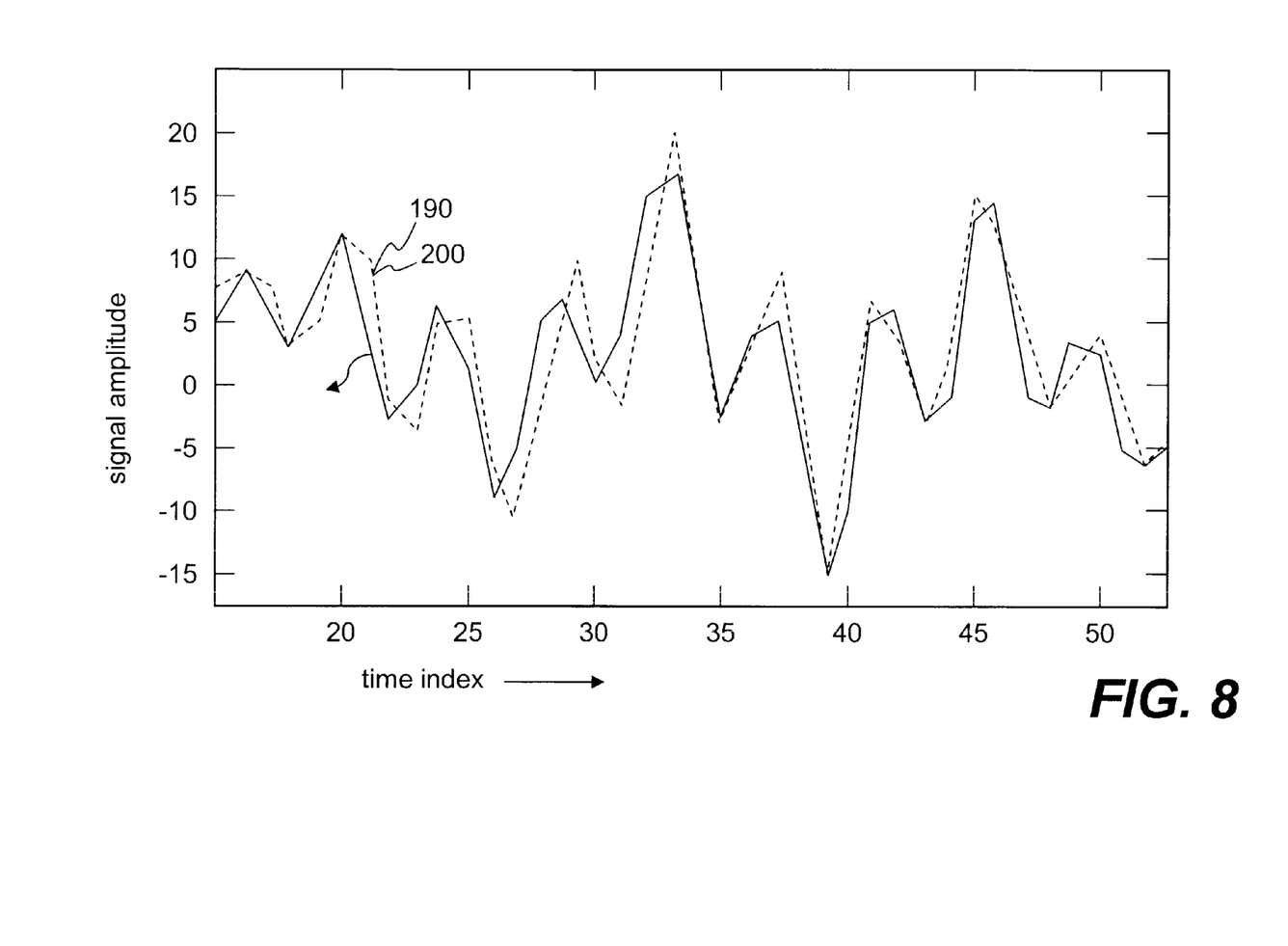

Turning now to FIG. 7, a human-perceived image signal 190 and a uncompensated time-indexed multiple sampling digital image signal 195 of a simulated time-domain image signal are presented. The simulated image signal comprises a collection of sinusoidal signals that are sampled satisfactorily according to the Nyquist rate. As can be seen from a casual inspection, the human-perceived image signal 190 differs considerably from the uncompensated digital image signal 195. This difference would appear to be distortion to a human view of the uncompensated digital image signal 195. After frequency compensation, the compensated digital image signal 200 is virtually indistinguishable from the human-perceived image signal 195.

Although the invention has been described with reference to particular embodiments, the description is only an example of the invention's application and should not be taken as a limitation. For example, although described with respect to time-indexed-multiple-sampling method, the invention is applicable to any video system in which the exposure time may vary from frame-to-frame. Moreover, it will be appreciated that other frequency transforms could be used in place of a discrete Fourier transform. In addition, the implementation of the invention is not limited to be on chip only. In other embodiments of the invention, the frames could be stored using off chip memory and processed offline (not real time). In this fashion, the invention enables functionalities such as "arbitrary speed shutter" (by converting the time samples into arbitrary exposure time samples), "de-blurring," and other features. Consequently, various adaptations and combinations of features of the embodiments disclosed are within the scope of the invention as defined by the following claims.

I claim:

1. A method of frequency compensation for a digital image sensor configured to select from a set of exposure times, comprising:

forming a plurality of digital image signals using the digital image sensor, each digital image signal corresponding to a frame, dividing the plurality of digital image signals into a plurality of subsets, wherein a first subset corresponds to a first exposure time, a second subset corresponds to a second exposure time, and so on, and at least one subset is missing a digital image signal for a given frame; and performing a discrete Fourier transform of each of the subsets of digital image signals to form a completed subset of digital image signals.

2. The method of claim 1, wherein the plurality of exposure times comprises an integer multiple of a given time period T.

3. The method of claim 2, wherein the integer multiples comprise T, 2T, 4T, and 8T.

4. The method of claim 3, wherein the plurality of subsets of digital image signals comprises a first subset formed using the exposure time T, a second subset formed using the exposure time 2T, a third subset formed using the exposure time 4T, and a fourth subset formed using the exposure time 8T.

5. The method of claim 4, wherein the completed subset is formed using the exposure time T.

6. The method of claim 4, wherein the completed subset is formed using the exposure time 2T.

7. The method of claim 4, wherein the completed subset is formed using the exposure time 4T.

8. The method of claim 4, wherein the completed subset is formed using the exposure time 8T.

9. An image processor, comprising:

a digital image sensor configured to produce a plurality of digital signals respectively confined with a plurality of exposure times to form a digital image signal during a given frame;

a memory configured to store a plurality of frames of digital image signals resulting from a light signal exciting the digital image sensor, the memory also storing the exposure times for each of the frames of digital image signals; and a processor configured to perform a discrete transform on the stored plurality of frames of digital image signals with reference to the corresponding stored exposure times to derive a complete set of digital image signals.

10. The image processor of claim 9, wherein the processor is a single instruction multiple data processor.

11. The image processor of claim 9, wherein the processor is further configured to store the complete set of digital image signals corresponding to the given exposure time for each frame for the plurality of frames within the memory.

* * * * *